UNITED STATES PATENT OFFICE 2,218,751

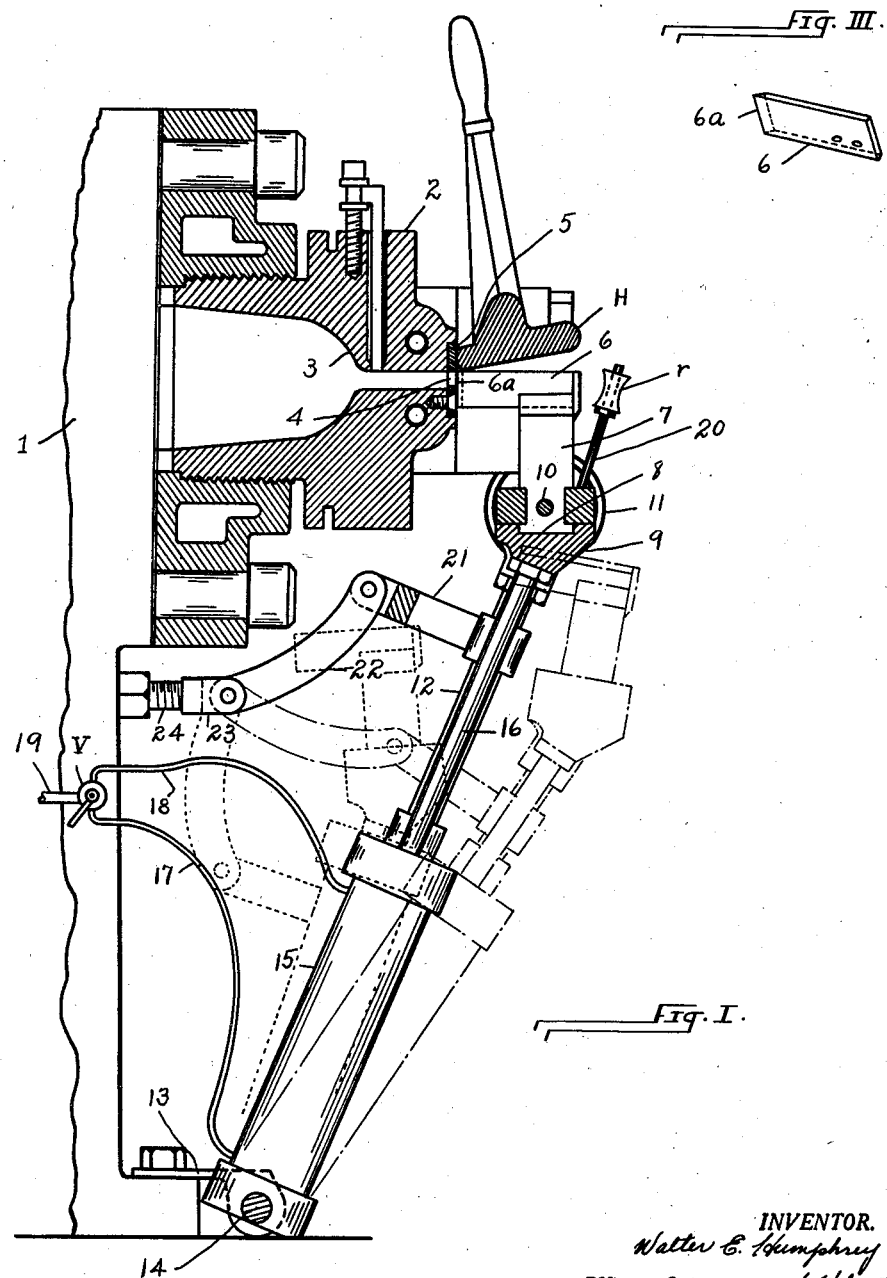

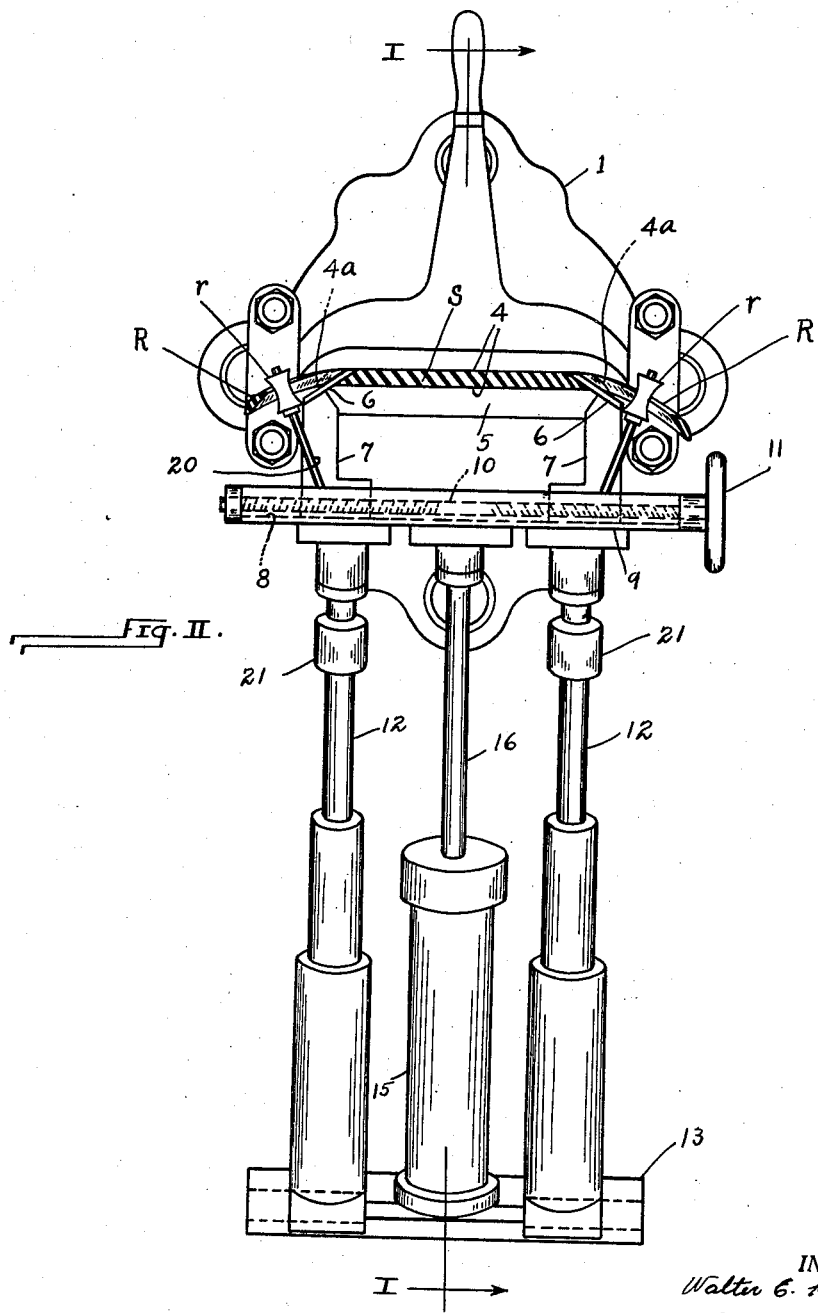

RUBBER-EXTRUDING APPARATUS

Walter E. Humphrey, Jeannette, Pa., assignor to Pennsylvania Rubber Company, a corporation of Pennsylvania Application December 13, 1937, Serial No. 179,390

5 Claims. (Cl. 18—12)

My invention relates to machines for extruding plastic material, particularly to machines for extruding uncured rubber into strips, and consists in means that cooperate with the extruding dies of such machines in producing strips (or other elongate articles) of desired form.

The invention has been successfully employed in trimming and feathering the edges of the extruded strips of uncured rubber that are used in the construction of automobile tires, and in such field of service I shall describe and define the invention, with the understanding that other fields are in contemplation.

In the accompanying drawings, Fig. I is a view, partly in vertical section and partly in side elevation, of apparatus embodying the invention; the extruding machine proper is fragmentarily illustrated, and the strip-trimming apparatus is shown in service position in full lines, in inactive position in dotted lines, and in course of movement between such positions in broken lines. Fig. II is a view of the apparatus in front elevation, showing in vertical section a strip of uncured rubber emerging from the extruding machine and undergoing the trimming or feathering operation in which the invention centers. The plane of section of Fig. I is indicated at I—I in Fig. II, and it is to be noted that the extruded article shown in Fig. II has, for the sake of clarity, been omitted from Fig. I. And Fig. III is a view in perspective of one of the trimming instruments of the apparatus.

Referring to the drawings, I show a typical rubber-extruding machine 1, a machine known in the art as a Tuber. The usual extruding head 2 of the machine includes a funnel-shaped passage 3 leading to an orifice 4 in an extruding die 5, and in known way the machine in operation forces uncured rubber (a plastic material) through the passage 3 and orifice 4, forming a continuous strip S (Fig. II), which in cross-section conforms to the shape of the orifice 4. In this case the orifice is a narrow, relatively elongate orifice, as shown in Fig. II.

In accordance with the invention, I organize a pair of knives 6, 6 with the extruding die 5. Each knife consists in a rectangular plate of steel, beveled at one end to form a cutting edge 6a; the knives are severally secured upon the upper ends of blocks 7; the blocks 7 at their bases are provided with heads and secured in a slideway 8 in a carriage 9, as shown in Fig. I, and are engaged by a threaded shaft 10. The shaft 10 is equipped with a hand-wheel 11, and is rotatable in the carriage to adjust the blocks relatively to one another in slideway 8.

As above mentioned, it is desired in this case that the edges of the extruded strip S shall be feathered, and to such end the knives 6, 6 are inclined to the general plane of the strip, as shown in Fig. II; the knives are supported in external abutment upon the face of the extruding die 5, with their cutting edges spaced at an interval inward from the opposite ends 4a, 4a of the extruding orifice; and in such organization the knives are effective to provide the desired feathered edges on the rubber strip S emerging in uninterrupted continuity from the extruding machine. That is to say, the knives stand exteriorly of the extruding die, with their effective edges extending angularly to one another in the plane of egress of the strip from the extruding die. As so organized the knives stem the flow through the die, and cleve the emerging body of the strip on the inclined planes of the knives, and thus provide the desired accurately beveled or feathered edges. The cut-away margins of the strip move outward in the form of continuous ribbons R that are conveyed into a suitable receptacle (not shown). To the end that the ribbons R, once they have been severed from the body of the strip S, shall not come into contact with the sharply feathered edges of the strip, I provide guiding rollers r that are mounted on upstanding spindles 20 on the carriage 9. The ribbons R pass around the outer sides of these rollers, and thus are prevented from closing again upon the edges of the strip.

Invention resides in the mounting for the carriage. Such mounting includes a mechanical jack for moving the carriage in arcuate path between service position, in which the knives 6, 6 are held in abutment upon the face of die 5, and inactive position, in which the knives lie to the side of the die and to the rear of the plane of the die orifice. All of this movement is accomplished by manipulation of a simple jack-controlling device.

Advantageously, the jack consists in a fluid-pressure cylinder 15, articulated at its lower end to a fixed support or base member 1, 13 by means of a pivot 14, and a plunger 16, rigidly secured at its upper end to the carriage 9. Flexible conduits 17 and 18 extend from the opposite ends of the cylinder to a fluid-pressure supply line 19, and a simple hand-valve V, providing selective control of flow from line 19 to conduits 17 and 18, provides the jack-controlling device mentioned.

More specifically, the carriage is borne on an expansible and contractible support. The support is mounted to move angularly as it expands and contracts, and such movement of the support is mechanically effected by means of the plunger 16. The support consists in a pair of telescopic legs 12, 12; the legs extend in parallelism with and on opposite sides of the cylinder 15, as shown in Fig. II, and at their lower ends are pivotally secured in common with the cylinder to the base member 13 which, as shown in Fig. I, is bolted to the base of the extruding machine 1.

A toggle linkage is arranged to swing the support assembly on its axis 14, when the plunger is reciprocated. The toggle linkage includes an arm 21 extending inward from the upper telescopic portion of each leg 12, and the distal end of each arm 21 is by an arcuate link 22 pivotally connected to the stationary body of the extruding machine 1. The connection is made in a yoke 23 which is formed on a stem 24 secured in threaded engagement with the body of the machine, and by virtue of such engagement the yoke 23 may be adjusted in proper horizontal position.

When for any reason it becomes desirable to remove the knives 6, 6 from position of service, the attendant adjusts the valve in such position that the plunger 16 is driven downward. The descending plunger draws the carriage 9 downward; the legs 12, 12 telescope, moving the arms 21 downward in unison with the plunger; and the descending arms swing the links 22 clockwise about their supporting yokes 23, with the consequence and effect that the carriage assembly swings clockwise on axis 14, contracting as it swings. During the initial stage of plunger descent, the movement of the carriage 9 is outward and downward, whereby the knives 6, 6 move in the direction of and transversely of the line of flow through the extruding die; as the descending plunger approaches the mid-point in its range of reciprocation, the carriage assembly reaches the position indicated in broken lines in Fig. I; and in the continued descent of the plunger the links 22, turning clockwise from broken-line position, become effective to swing the carriage assembly counter-clockwise on the axis 14. As the inner end of the plunger reaches the bottom of the cylinder 15, the assembly comes to rest in the position indicated in dotted lines, with the tools 6, 6 supported beneath the extruding head and to the rear of the plane of the extruding die. Manifestly, in such position, the tool-carrying assembly offers no obstruction to the operation of the extruding machine in normal way, or to the removal and replacement of the extruding die, or of the extruding head itself. And if the extruding machine is to be taken out of service for a substantial interval of time, the usual hood H of the machine is swung downward into protecting position upon the face of the extruding die.

When the tool-carrying assembly is to be restored to service position, the movements of the parts are the opposite of those described. That is, the plunger rises, the carriage 9 moves first outward and upward from beneath the extruding head 2, and then moves upward and inward, carrying the knives into position against the extruding die 5. So long as the knives are in such position of service, the plunger is constantly subject to fluid pressure delivered through lines 19 and 17, and it is important to note that a substantial component of the continuously applied thrust of the plunger is, by virtue of the linkage 21, 22, effective in horizontal direction, serving powerfully to maintain the cutting edges of the knives against the face of the extruding die.

I claim as my invention:

1. In a plastic-extruding machine including an extruding die having an orifice, a knife standing exteriorly of said die, and means for shifting the knife from such position to a position of inaction; the refinement herein described in which such means include a support, a telescopic leg pivotally secured to said support, a carriage mounted on the distal end of such leg and carrying said knife, an articulated linkage extending from said support and connected, at a point removed from the pivot support of the leg, to said leg and carriage assembly, and a plunger operated by fluid under pressure to shift said carriage axially of said telescopic leg and angularly of the pivotal support of the leg.

2. In an extruding machine including an extruding die, a pair of knives adapted to refine the shape of the extruded article, and means for presenting said knives from an inactive position remote from the die to an active position at the mouth of the die; the refinement herein described in which said means include a carriage bearing said knives, an angularly movable telescopic structure supporting said carriage, and means including a pneumatic ram for telescoping and swinging such structure, to shift the supported carriage and move said knives between said positions.

3. In an extruding machine including an extruding die, a tool cooperating with the die in forming an extruded article of desired form, and means for presenting said tool from an inactive position remote from the die to an active position adjacent to the mouth of the die; the refinement herein described in which said means include a carriage bearing said tool, an angularly movable telescopic structure supporting said carriage, and means including a pneumatic ram for telescoping and swinging such structure, to shift the supported carriage and move said tool from one to the other of said positions.

4. In an extruding machine including an extruding die, a pair of knives adapted to refine the shape of the extruded article, and means for presenting said knives from an inactive position remote from the die to an active position at the mouth of the die; the refinement herein described in which said means include a carriage bearing said knives, an angularly movable telescopic structure supporting said carriage, and means including a pneumatic ram for telescoping and swinging such structure, to shift the supported carriage and move said knives between said positions, together with means included in said carriage for adjusting said knives relatively to one another and transversely of the line of extrusion of said die.

5. In an extruding machine including an extruding die, a tool cooperating with the die in forming an extruded article of desired form, and means for presenting said tool from an inactive position remote from the die to an active position adjacent to the mouth of the die; the refinement herein described in which said means include a carriage bearing said tool, a support, a carriage-supporting member articulated to said support, and means including a ram for swinging said member on the axis of its articulation to said support, to shift the supported carriage and move said tool from one to the other of said positions.

WALTER E. HUMPHREY.